(12) United States Patent (10) Patent No.: US 8,904,173 B2
Shamsaasef et al. (45) Date of Patent: Dec. 2, 2014

(54) SYSTEM AND METHOD FOR SECURELY MOVING CONTENT

(75) Inventors: Rafie Shamsaasef, San Diego, CA (US); Jiang Zhang, San Diego, CA (US); Petr Peterka, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 805 days.

(21) Appl. No.: 12/975,972

(22) Filed: Dec. 22, 2010

(65) Prior Publication Data

US 2012/0166799 A1 Jun. 28, 2012

(51) Int. Cl.
*G06F 21/00* (2013.01)
*G06F 21/10* (2013.01)

(52) U.S. Cl.
CPC ..................................... *G06F 21/10* (2013.01)
USPC .......................................................... 713/168

(58) Field of Classification Search
None
See application file for complete search history.

(56) References Cited

U.S. PATENT DOCUMENTS

| | | | | |
|---|---|---|---|---|
| 7,617,540 | B2 * | 11/2009 | Kim et al. | 726/26 |
| 8,290,156 | B2 * | 10/2012 | Johnson et al. | 380/200 |
| 2004/0158712 | A1 * | 8/2004 | Lee et al. | 713/165 |

FOREIGN PATENT DOCUMENTS

| | | |
|---|---|---|
| EP | 1416406 A1 | 5/2004 |
| KR | 20090019659 A | 2/2009 |

OTHER PUBLICATIONS

Patent Cooperation Treaty, "International Search Report and Written Opinion of the International Searching Authority," for Int'l Application No. PCT/US2011/065880; Apr. 10, 2012.

* cited by examiner

*Primary Examiner* — Brandon Hoffman
*Assistant Examiner* — Helai Salehi
(74) *Attorney, Agent, or Firm* — Amin, Turocy & Watson, LLP (57) ABSTRACT

A domain controller is provided for use with a content source and a media device. The content source can provide encrypted content and rights data corresponding to the encrypted content. The media device can provide a request for the encrypted content and the rights data. The domain controller includes a communication portion, a digital rights management portion and a memory portion. The communication portion can engage in a first bi-directional communication with the content source and can engage in a second bi-directional communication with the media device. The digital rights management portion can receive the rights data. The memory portion can store the encrypted content. The second bi-directional communication includes an authorization and authentication communication between the communication portion and the media device, a secure move message exchange between the communication portion and the media device and a content download from the communication portion to the media device.

20 Claims, 11 Drawing Sheets

SYSTEM AND METHOD FOR SECURELY MOVING CONTENT

BACKGROUND

Digital rights management (DRM) provides access control technologies that can be used by hardware manufacturers, publishers, copyright holders and individuals to limit the usage of content and devices. The DRM associated with a particular piece of digital data may provide: a set of access rights, e.g., can the receiver of the digital data access the digital data, and if so, how many times; and a set of copy rights, e.g., can the receiver of the digital data copy the digital data, and if so, how many times. DRM is deployed to prevent the unauthorized viewing, copying and/or distribution of digital content.

For communication systems, providing DRM for multiple devices seeking access to the same content during the same timeframe may result in rejection of access until completion of the content transfer to a device which may result in delays associated with the rejection of digital rights. Additionally, digital rights may be unnecessarily allocated to a device as a result of a failure in the transfer of the content and impede authorized devices access to content.

What is needed is a method and system for properly maintaining digital rights during secure transfer of content for communication systems.

BRIEF SUMMARY

The present invention provides for secure content transmission for a communication system while maintaining digital rights during the transmission of the content.

In accordance with an aspect of the present invention, a domain controller is provided for use with a content source and a media device. The content source can provide encrypted content and rights data corresponding to the encrypted content. The media device can provide a request for the encrypted content and the rights data. The domain controller includes a communication portion, a digital rights management portion and a memory portion. The communication portion can engage in a first bi-directional communication with the content source and can engage in a second bi-directional communication with the media device. The digital rights management portion can receive the rights data. The memory portion can store the encrypted content. The second bi-directional communication includes an authorization and authentication communication between the communication portion and the media device, a secure move message exchange between the communication portion and the media device and a content download from the communication portion to the media device.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

An aspect of the present invention is drawn to secure content transmission within a communication system while maintaining digital rights during the transmission of the content. Non-limiting examples of operations which may be securely performed include initiating, committing, recovering and canceling transfers of content. Furthermore, secure transfer of content may be performed without requiring content re-encryption.

Digital rights may be reserved during transmission of content with transfer of digital rights completed following the successful completion of content transmission thereby preventing unnecessary rejection of access to the content by secondary requestors of the content.

Another aspect of the present invention is drawn to implementing a timeout mechanism for secure content transmission within a communication system while maintaining digital rights during the transmission of the content.

A timeout mechanism may indicate a failure in transferring content, thereby preventing unnecessary allocation of digital rights. The timeout mechanism enables recovery of digital rights as a result of a failure in transferring content. This will be described in more detail below with reference to FIGS. 1A-1F.

Figure 1A:
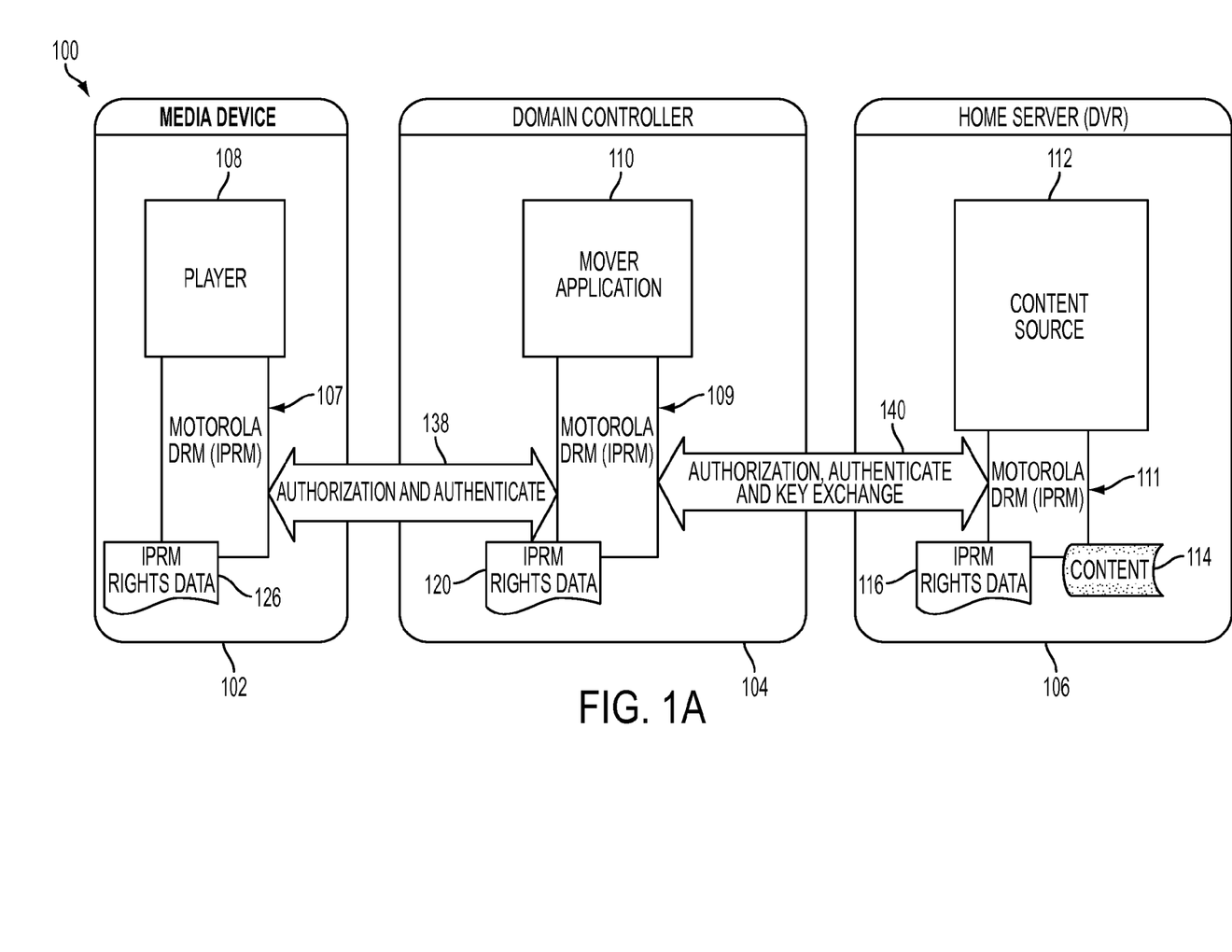
FIGS. 1A-F illustrate a block diagram of states of an example communication system, in accordance with an aspect of the present invention.

FIGS. 1A-F illustrate a block diagram of states of an example communication system, in accordance with an aspect of the present invention FIG. 1A illustrates a block diagram of an example communication system 100 at an initial state, in accordance with an aspect of the present invention.

Communication system 100 includes a media device 102, a domain controller 104 and a server device 106. Each of the elements of communication system 100 are illustrated as individual devices, however, in some embodiments of the present invention at least two of media device 102, domain controller 104 and server device 106 may be combined as a unitary device. Further, in some embodiments, at least one of media device 102, domain controller 104 and server device 106 may be contained as a utility, program, or subprogram, in any desired tangible computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a tangible computer readable storage medium, which include storage devices. Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above. When information is transferred or provided over a network or another communications connection (either hardwired, wireless, or a combination of hardwired or wireless) to a computer, the computer properly views the connection as a tangible computer-readable storage medium. Thus, any such connection is properly termed a tangible computer-readable storage medium. Combinations of the above should also be included within the scope of computer-readable storage media.

Media device 102 may request, receive, display and manage encrypted content processed and communicated by domain controller 104 with source for encrypted content provided by server device 106.

Media device 102 includes a digital rights management portion (DRM portion) 107 and a player portion 108. Each of DRM portion 107 and player portion 108 are illustrated as individual devices, however, in some embodiments they may be combined as a unitary device. At least one of DRM portion 107 and player portion 108 may be contained as a utility, program, or subprogram, in any desired tangible computer readable storage medium. In addition, the operations may be embodied by computer programs, which can exist in a variety of forms both active and inactive.

DRM portion 107 may transmit, receive and manage information related to data rights associated with encrypted and/or encoded content. Furthermore, DRM portion 107 may request, receive and process encrypted and encoded content for generation of unencrypted decoded content.

Player portion 108 may receive unencrypted decoded content and display unencrypted decoded content for viewing by a user (not shown).

As an example for purposes of discussion, media device 102 may request and/or receive content. Received or requested content may processed for display by player portion 108. Received content for display by player portion 108 may contain associated data rights which may be received, processed and maintained by DRM portion 107. As a result of receiving data rights information, DRM portion 107 may process, and maintain the data rights information as denoted by a rights data 126. Rights data 126 may be created as a result of an exchange of information as denoted by a communication exchange 138. Non-limiting examples of information which communication exchange 138 may communicate include authorization and authentication. Rights data 126 may be maintained for the associated information as exchanged by communication exchange 138 and for content as received, transmitted, processed by player portion 108.

Domain controller 104 includes a digital rights management portion 109 and a mover portion 110.

Digital rights management portion 109 may transmit, receive and manage information related to data rights associated with encrypted and encoded content. Furthermore, DRM portion 107 may request, receive and process encrypted and/or encoded content.

Mover portion 110 may process content. Non-limit examples of processing performed by mover portion 110 include receive, store, transmit, decrypt, decode, encrypt and encode content.

As an example for purposes of discussion, domain controller 104 may request, transmit and/or receive content. Received or requested content may be maintained for reception, transmission and storage by mover portion 110. Received content for storage and transmission by mover portion 110 may contain associated data rights which may be received, processed and maintained by digital rights management portion 109. As a result of receiving data rights information, digital rights management portion 109 may process and maintain the data rights information as denoted by a rights data 120. Rights data 120 may be created as a result of an exchange of information as denoted by a communication exchange 140. Non-limiting examples of information which communication exchange 140 may communicate include authorization, authentication and key exchange. Rights data 120 may be maintained for the associated information as exchanged by communication exchange 140 and for content as received, transmitted, processed and stored by mover portion 110.

Server device 106 includes a digital rights management portion 111 and a content source 112.

Digital rights management portion 111 may transmit, receive and manage information related to data rights associated with content. Non-limiting examples for types of content include decrypted, decoded, encrypted and/or encoded content. Furthermore, digital rights management portion 111 may request, receive, process and transmit content. Non-limiting examples for types of content include decrypted, decoded, encrypted and/or encoded content.

Content source 112 may transmit, receive and store content. Non-limiting formats for storage of content include encrypted, decrypted, encoded, decoded. Furthermore, server device 106 may transmit, receive and store content. Non-limiting examples for the types of content include encrypted and encoded.

As an example for purposes of discussion, server device 106 may request and/or receive a content 114. Non-limiting examples of the format for content 114 include encrypted, encoded, decrypted or decoded. Furthermore, content 114 may be encoded and encrypted. Received or requested content 114 may be maintained for storage by content source 112. Received content 114 for storage by content source 112 may contain associated data rights which may be received, processed and maintained by digital rights management portion 111. As a result of receiving data rights information, digital rights management portion 111 may process, and maintain the data rights information as denoted by a rights data 116. Rights data 116 may be maintained for the associated content 114 as received, transmitted, processed and stored by content source 112.

FIG. 1A illustrates a communication system for transfer and processing of content for display to a user. Furthermore, FIG. 1A illustrates initiation of rights data by respective digital rights management portions. Furthermore, FIG. 1A illustrates content received, maintained and stored by a content source.

Figure 1B:
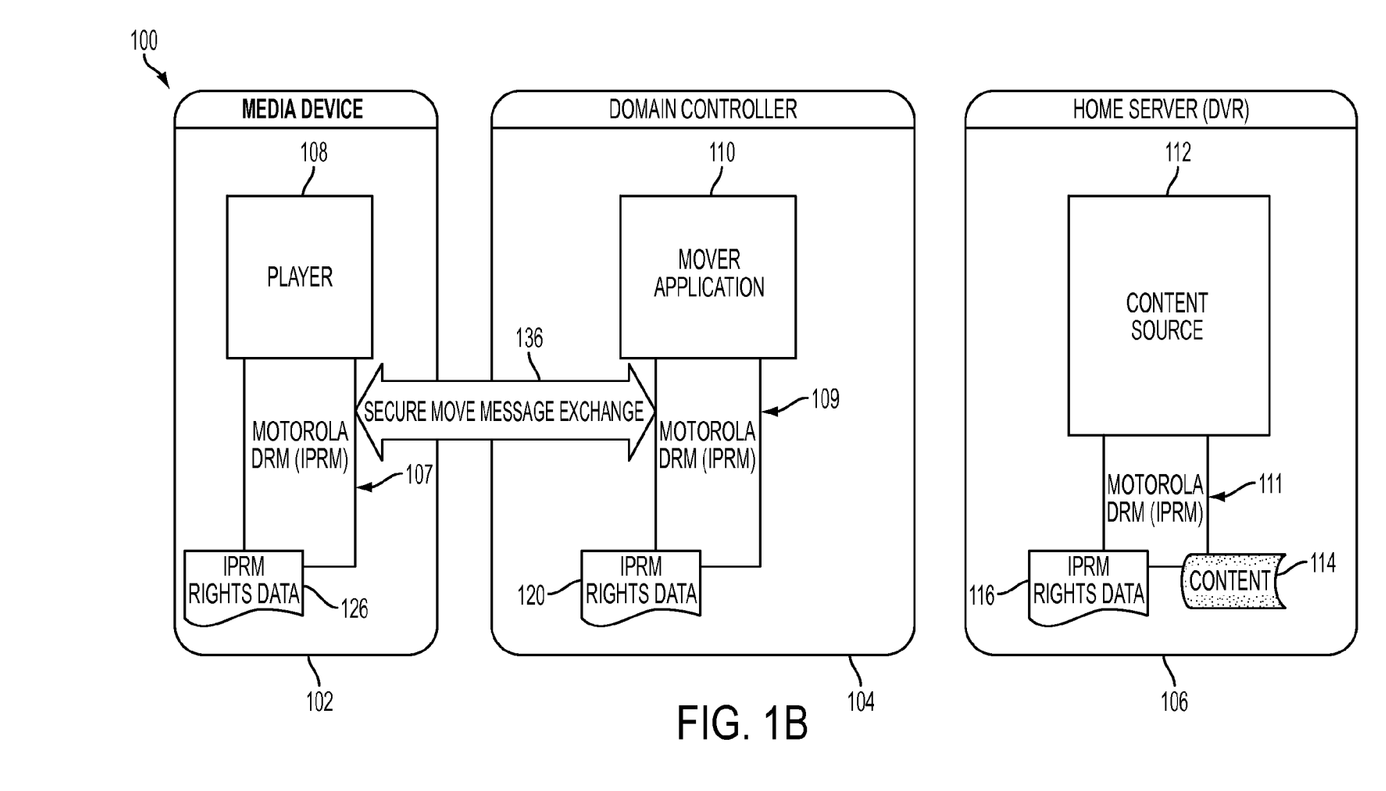

FIG. 1B illustrates a block diagram of example communication system 100 at a second state when a request for content may be securely transmitted, received and processed between a media device and a domain controller, in accordance with an aspect of the present invention.

Elements of FIG. 1B in common with FIG. 1A previously discussed with respect to FIG. 1A will not be discussed with respect to FIG. 1B.

As an example for purposes of discussion, a user (not shown) via player portion 108 may request access to information as denoted by content 114 and maintained by server device 106. Request for access to content 114 may be processed by DRM portion 107. DRM portion 107 may communicate a request for access to content 114 with digital rights management portion 109 of domain controller 104 via a secure move message exchange 136. Furthermore, rights data 126 and rights data 120 may be updated to reflect the request for content 114 as performed by player portion 108.

Figure 1C:
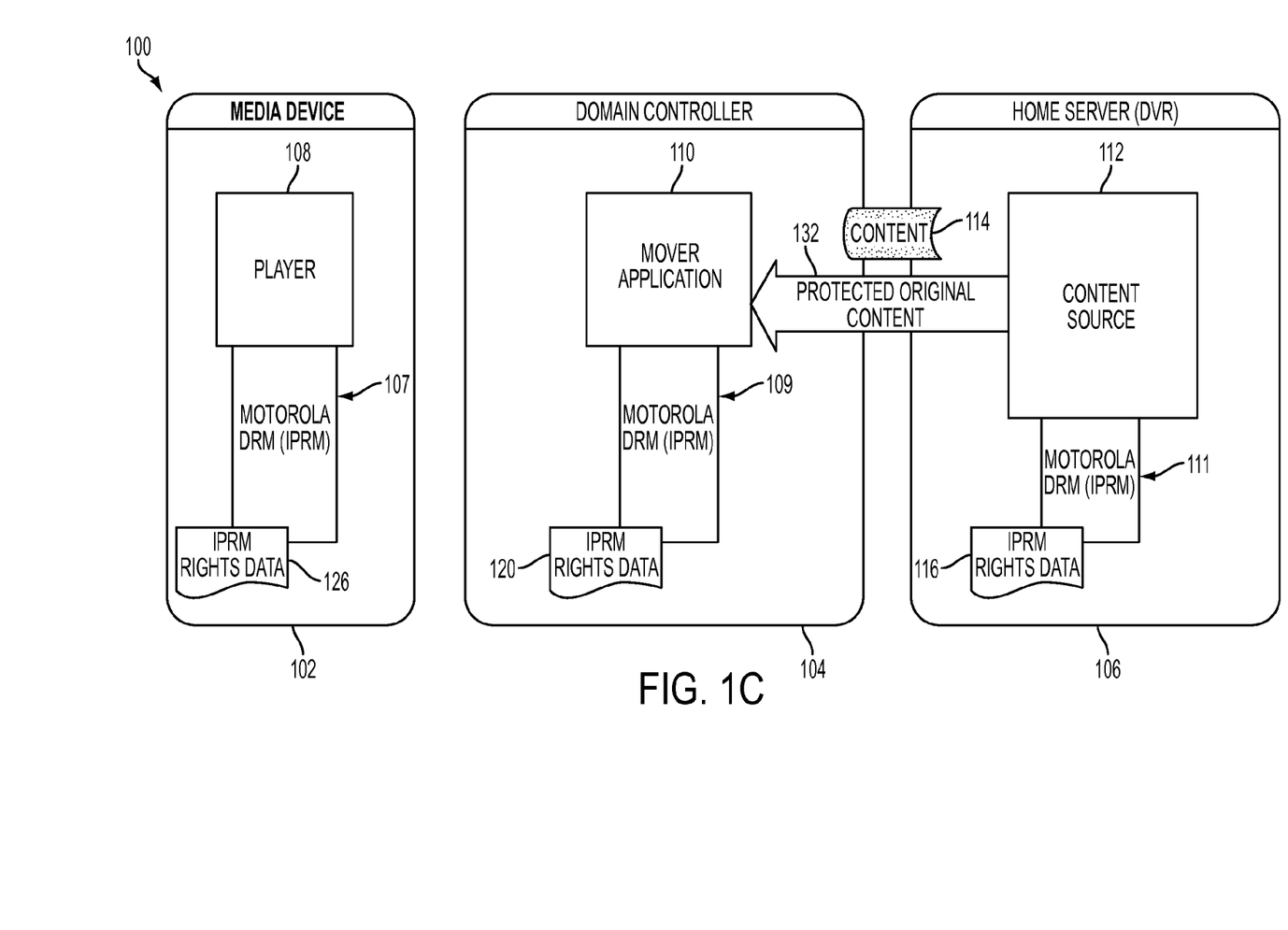

FIG. 1C illustrates a block diagram of example communication system 100 at a third state where content is securely transmitted from a server device to a domain controller, in accordance with an aspect of the present invention.

Elements of FIG. 1C in common with FIGS. 1A-B previously discussed with respect to FIGS. 1A-B will not be discussed with respect to FIG. 1C.

Continuing with the example as initiated with respect to FIG. 1B, the request for content 114 as communicated to domain controller 104, may be communicated from domain controller 104 to server device 106. Furthermore, server device 106 may communicate content 114 to domain controller 104 via a protected original content exchange 132.

Figure 1D:
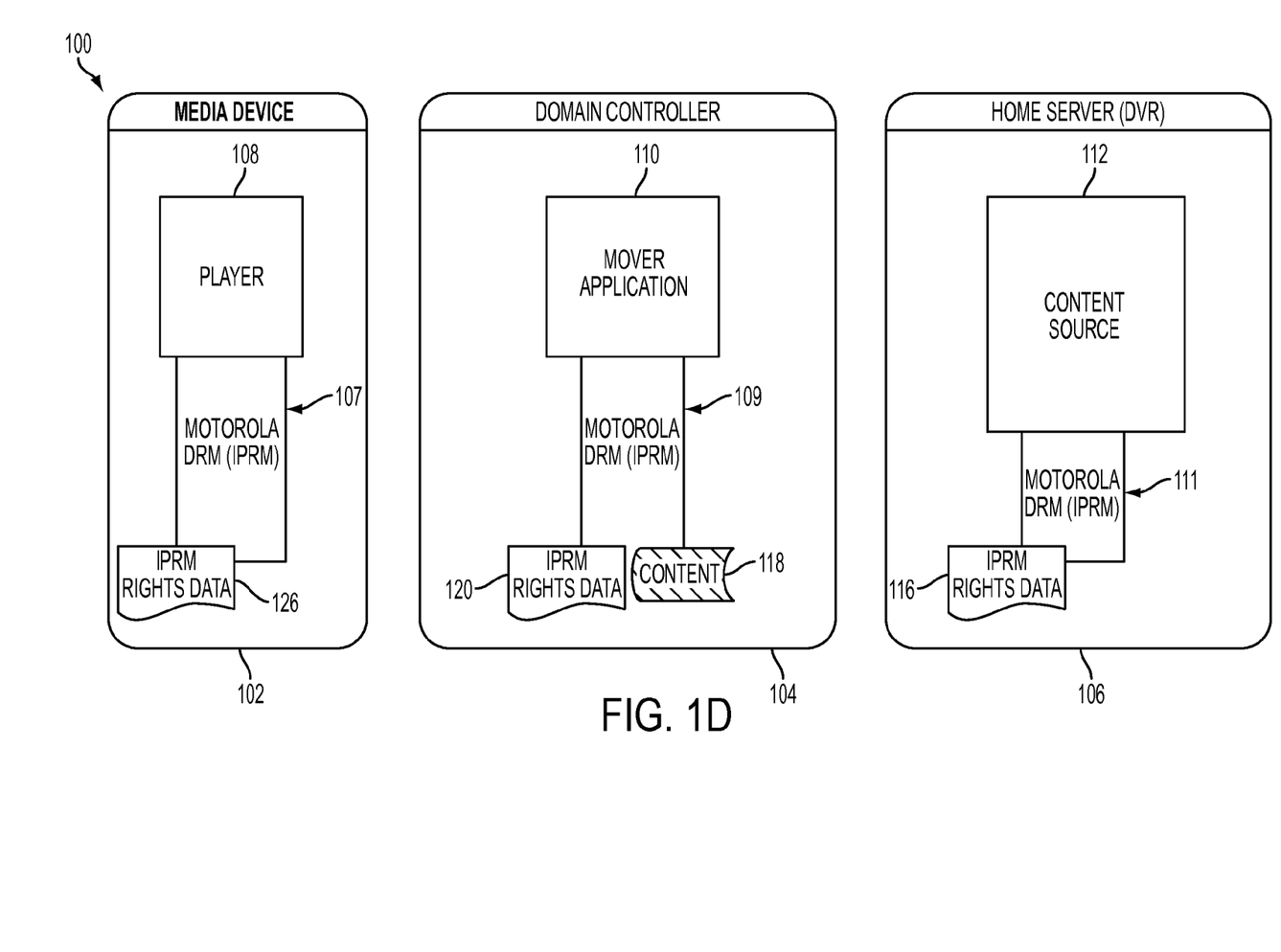

FIG. 1D illustrates a block diagram of example communication system 100 at a fourth state where the content securely resides at the domain controller, in accordance with an aspect of the present invention.

Elements of FIG. 1D in common with FIGS. 1A-C previously discussed with respect to FIGS. 1A-C will not be discussed with respect to FIG. 1D.

Continuing with the example initiated with FIG. 1B and continued with respect to FIG. 1C, the request for content 114 as communicated to domain controller 104, may result in the receipt and processing of content 114 by mover portion 110 as illustrated in FIG. 1C. Furthermore, mover portion 110 may process received content 114 for generating a content 118. Non-limiting examples of processing performed by mover portion 110 may include decryption, decoding, encryption and encoding. Content 118 may be of a different encryption and/or encoding than the encryption/encoding of content 114. Furthermore, data rights associated with content 114 and content 118 may be updated with respect to rights data 120. However, data rights associated with content 114 and content 118 may not be updated until completion of the transfer and processing performed to generate content 118. Furthermore, a timeout mechanism may be implemented with regard to completion of transfer and processing of content. For a condition of experiencing a failure in transfer and a resulting timeout event, data rights may be relinquished thus allowing access to content by other entities (not shown).

Figure 1E:
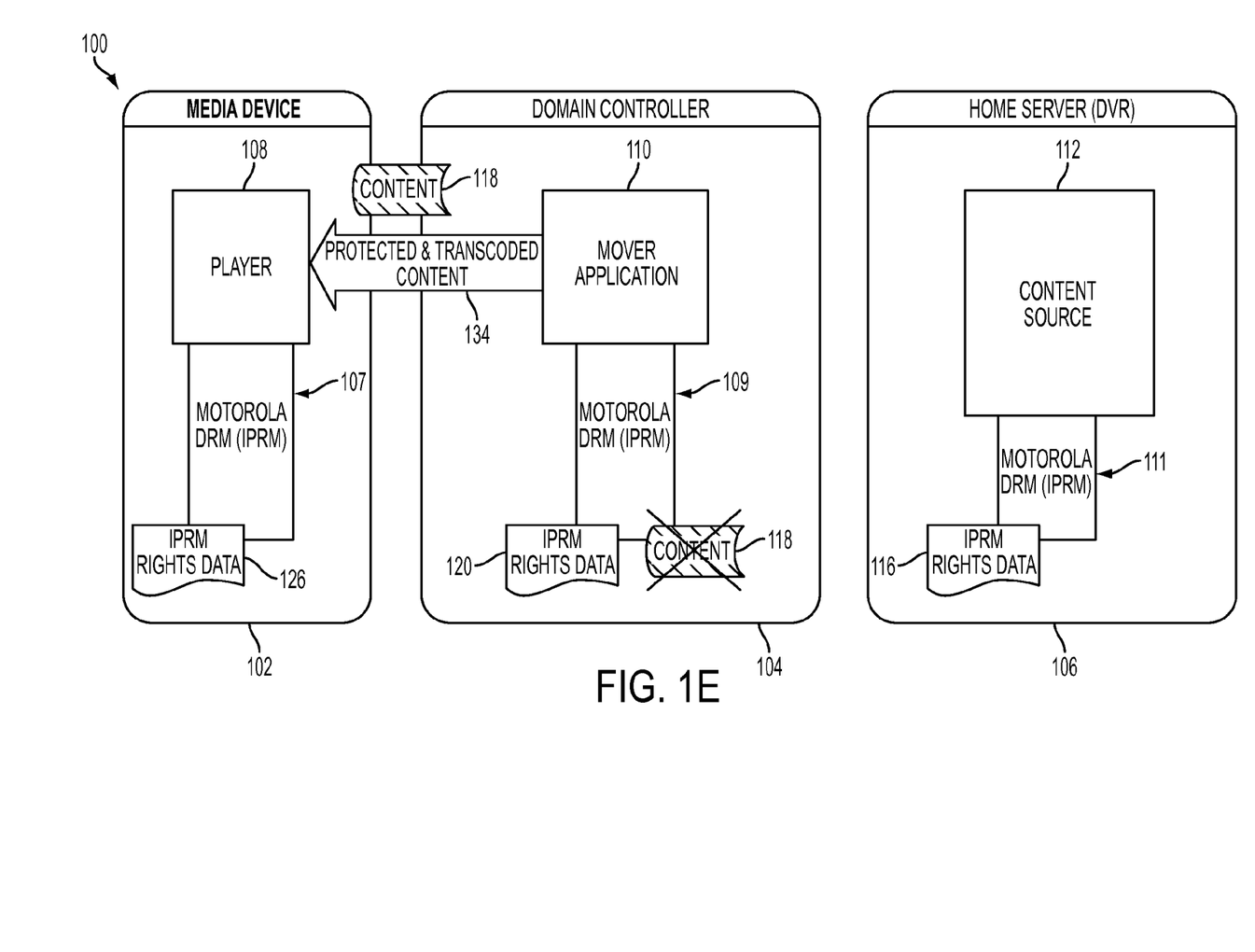

FIG. 1E illustrates a block diagram of example communication system 100 at a fifth state where the content is securely transmitted from the domain controller to the media device, in accordance with an aspect of the present invention.

Elements of FIG. 1E in common with FIGS. 1A-D previously discussed with respect to FIGS. 1A-D will not be discussed with respect to FIG. 1E.

Continuing with the example initiated with FIG. 1B, the request for content 114 as communicated to domain controller 104, as illustrated in FIG. 1B, may result in the receipt and processing of content 114 by mover portion 110 as illustrated in FIG. 1C. Further, mover portion 110 may process received content 114 for generating content 118 as illustrated in FIG. 1D. Still further, mover portion 110 may communicate content 118 to media device 102 via a secure communication exchange 134. Digital rights management portion 109 may remove content 118 from storage by domain controller 104 as illustrated in FIG. 1E. Data rights associated with content 118 may be updated with respect to rights data 126 and rights data 120. Rights data 126 and rights data 120 may be managed such that unauthorized access to content 118 is not allowed. Furthermore, rights data 126 and rights data 120 may be maintained such that rights data associated with content 118 may be relinquished in the event of a timeout as a result of a failure in the transfer of content 118. Relinquishing data rights as a result of a transfer timeout enables other entities (not shown) to gain access to content 118.

FIG. 1E illustrates secure transmission and processing of content such that unauthorized access is not allowed and a timeout event as a result of a transmission failure results in relinquishing data rights associated with the content thus enabling other entities (not shown) access to the content.

Figure 1F:
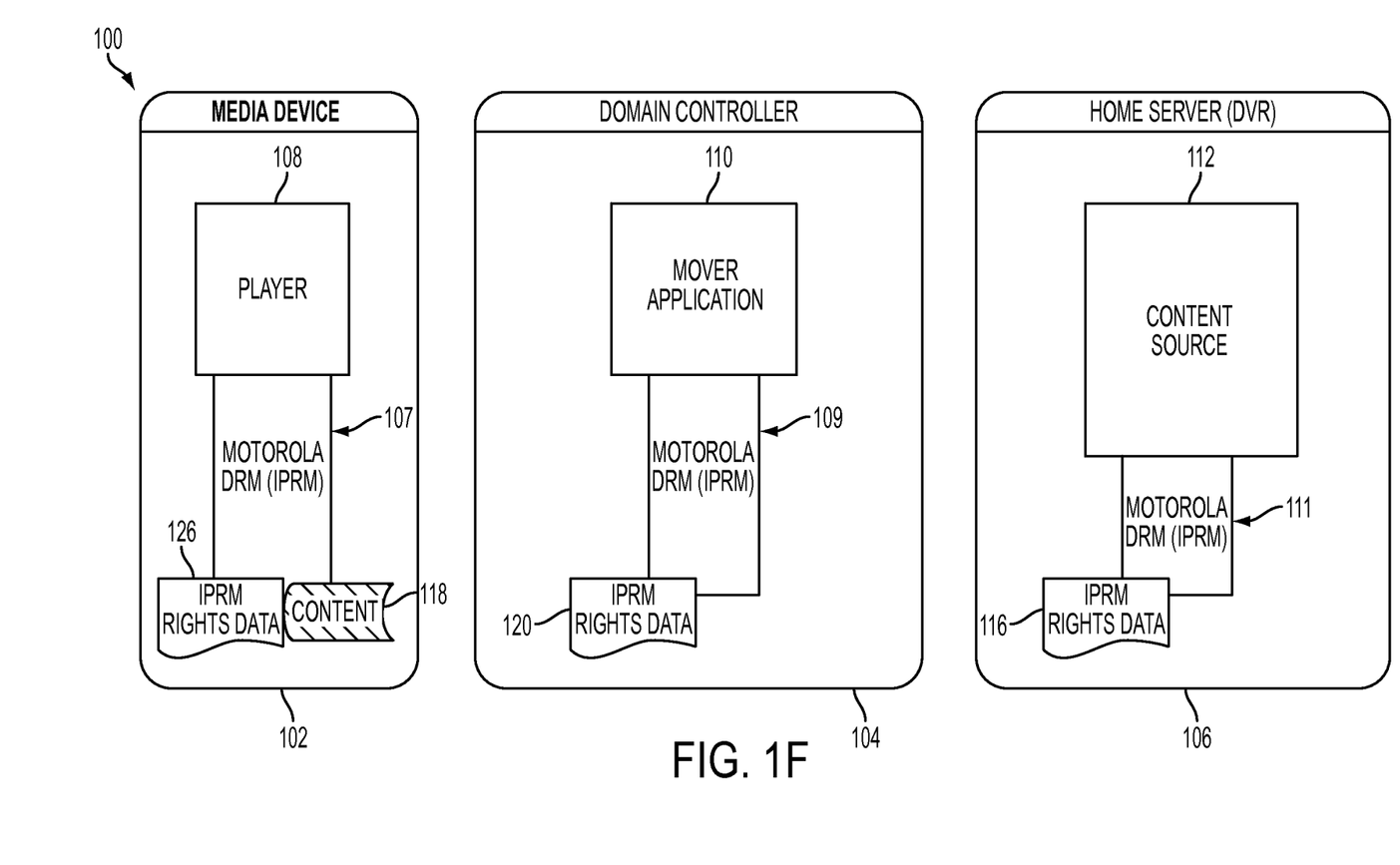

FIG. 1F illustrates a block diagram of example communication system 100 at a sixth state where the content securely resides at the media device, in accordance with an aspect of the present invention.

Elements of FIG. 1F in common with FIGS. 1A-E previously discussed with respect to FIGS. 1A-E will not be discussed with respect to FIG. 1F.

Continuing with the example for further discussion as initiated with respect to FIG. 1B, the request for content 114 as communicated to domain controller 104 may result in the receipt and processing of content 114 by mover portion 110 as illustrated in FIG. 1C. Mover portion 110 may process received content 114 for generating content 118 as illustrated in FIG. 1D. Mover portion 110 may communicate content 118 to media device 102 via secure communication exchange 134 as illustrated in FIG. 1E. Content 118 may be processed and stored by DRM portion 107 for processing and display by player portion 108. The data rights associated with content 118 may be updated with respect to rights data 126 and rights data 120 following successful completion of the transfer and processing of content 118. A timeout mechanism may be implemented for detecting a failure in the transfer of content 118. For an occurrence of a transfer timeout, data rights associated with content 118 may be relinquished and updated by rights data 126 and rights data 120 such that other entities (not shown) may gain access to the data rights associated with content 118.

FIG. 1F illustrates secure transmission and processing of content between a domain controller and a media device. Data rights associated with the content may be updated following the successful completion of the transfer and processing of the content. Furthermore, in the event of a transmission timeout, data rights associated with the content may be relinquished enabling access to the content by other entities (not shown).

Figure 2:
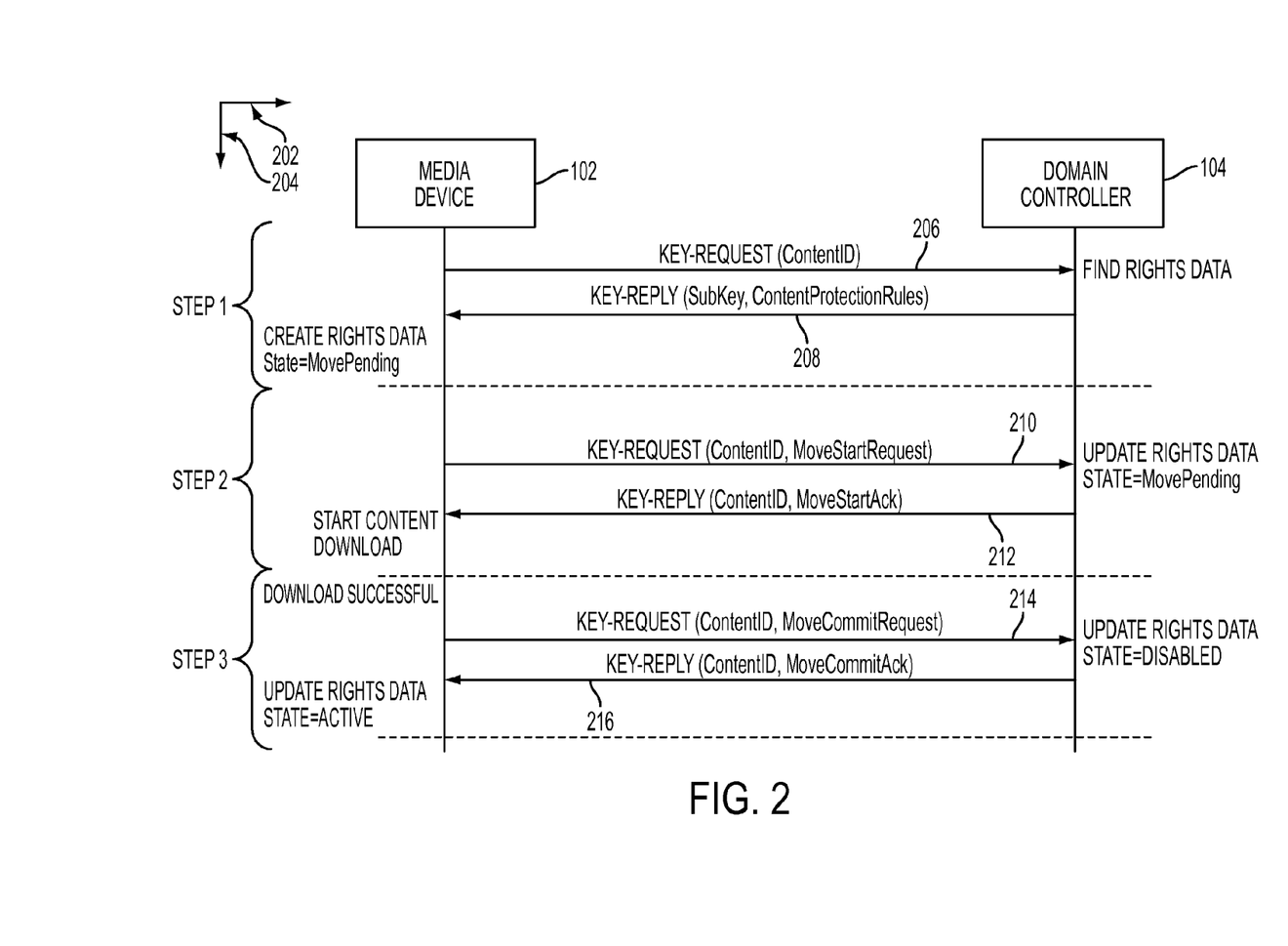
FIG. 2 illustrates an example communication exchange diagram for the states of the example communication system as illustrated in FIGS. 1A-F, in accordance with an aspect of the present invention.

FIG. 2 illustrates an example communication exchange diagram for example communication system 100, in accordance with an aspect of the present invention.

An x-axis 202 represents exchanges of communication between media device 102 and domain controller 104 of communication system 100 and a y-axis 204 represents time with units of time.

Media device 102 may communicate a key request to domain controller 104 via a key request 206.

Domain controller 104 may receive and process key request 206. Furthermore, domain controller 104 may search for and update rights data associated with request. Furthermore, domain controller 104 may reply to key request 206 by communicating a key reply 208 to media device 102.

Media device 102 may examine key reply 208. Furthermore, if the copy protection rules as communicated by key reply 208 indicate copying of the content not allowed, media device may create a rights data object with a state indicating a "move pending."

Media device 102 may communicate a key request 210 to domain controller 104 with information indicating initiation of a transfer associated with content to be transferred.

Domain controller 104 may receive and process key request 210. For a determination of correct information provided in key request 210, domain controller may open a rights data file for verifying the allowance of the initiation of transfer as provided by key request 210. Furthermore, domain controller 104 may update rights data state with an indication of move pending. Still further, domain controller 104 may initiate a timer for determining if content transfer does not complete successfully within the time frame for the timer. A value for a timer may be configured for a time value larger than required for transfer of content from domain controller 104 to media device 102.

Domain controller 104 may communicate a key reply 212 to media device 102 indicating an acknowledgement for the initiation of transfer.

Media device 102 may receive and processes key reply 212. Non-limiting examples of processing performed by media device 102 includes verifying correctness of key reply 212 and verifying content denoted as move pending. Media device 102 may initiate transfer of content from domain controller 104.

Following successful transfer of content from domain controller 104 to media device 102, media device 102 may communicate a key request 214 to domain controller 104 indicating a transfer commit request.

Domain controller 104 may receive and process key request 214. Non-limiting examples of processing includes verifying key request 214 for correctness and verifying the state denoted as move pending. Furthermore, domain controller 104 may cancel timer for successful content transfer and update the state to disabled. Denoting state as disabled prevents domain controller from sharing content with other devices or from providing local access to the content.

Domain controller 104 may communicate a key reply 216 to media device 102. Information provided by key reply 216 may communicate a transfer commit acknowledgement. Furthermore, domain controller 104 may maintain persistent storage of rights data object associated with content.

Media device 102 may receive and process key reply 216. Non-limiting examples of processing includes verifying for correctness. Media device 102 may update state of local rights data to "active" which may enable local display of content and/or sharing the content with other devices in compliance with the associated rights data for the content. Furthermore, media device 102 performs persistent storage of the rights data object associated with the content.

Non-limiting examples of error conditions which may occur and be processed by media device 102 and domain controller 104 include time outs, interruptions and requests for content by a multiplicity of devices.

FIG. 2 illustrates a secure exchange of communication between a media device and a domain controller. Furthermore, associated data rights management and operation of transfer timeout mechanisms are presented.

Figure 3:
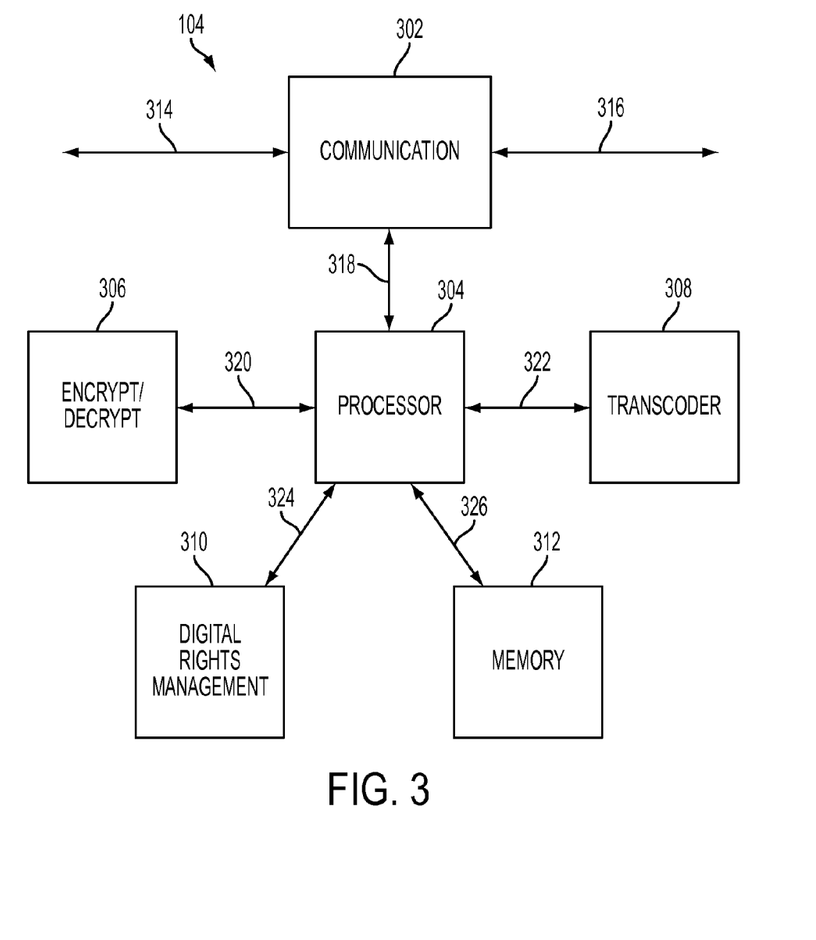
FIG. 3 illustrates a block diagram of an example domain controller as illustrated in FIGS. 1A-F, in accordance with an aspect of the present invention.

FIG. 3 illustrates a block diagram of example domain controller 104, in accordance with an aspect of the present invention.

Domain controller 104 includes a communication portion 302, a processor portion 304, a security portion 306, a transcoder portion 308, a digital rights management portion 310 and a memory portion 312. Each of the elements of domain controller 104 are illustrated as individual devices, however, in some embodiments at least two of communication portion 302, processor portion 304, security portion 306, transcoder portion 308, digital rights management portion 310 and memory portion 312 may be combined as a unitary device. Further, in some embodiments at least one of communication portion 302, processor portion 304, security portion 306, transcoder portion 308, digital rights management portion 310 and memory portion 312 may be implemented as computer-readable media for carrying or having computer-executable instructions or data structures stored thereon.

Communication portion 302 may communicate bi-directionally with external entities. Non-limiting examples of external devices include media players, server devices, computers and computer network equipment.

Processor portion 304 may receive, transmit and process information. Furthermore, processor portion 304 may access and perform operational instructions stored in memory portion 312.

Security portion 306 may perform encryption and decryption of digital information.

Transcoder portion 308 may perform conversion of information from one code format to a different code format.

Digital rights management portion 310 may operate receive, transmit and process rights data. Non-limiting examples of processing performed by digital rights management portion include performing transfer timeout monitoring, verification, confirmation, denial, acknowledgement, storing, deleting, updating and modifying information related to rights data.

Memory portion 312 may receive, transmit and store information. Non-limiting examples of information received, transmitted and stored by memory portion 312 include data and instruction codes.

Communication portion 302 may communicate bi-directionally with external entities via a communication channel 314 and a communication channel 316. Furthermore, communication portion 302 may communicate bi-directionally with processor portion 304 via a communication channel 318. Processor portion 304 may communicate bi-directionally with security portion 306 via a communication channel 320, transcoder portion 308 via a communication channel 322, digital rights management portion 310 via a communication channel 324 and memory portion 312 via a communication channel 326.

Processor portion 304 may retrieve operational codes from memory portion 312 for determining operation of processor portion 304. Furthermore, processor portion 304 may receive and process information from communication portion 302 for storage in memory portion 312. Processor portion 304 may request and retrieve information from memory portion 312 for external transmission to domain controller 104 via communication portion 302. Processor portion 304 may transmit data to security portion 306 for encryption or decryption. Processor portion 304 may transmit data to transcoder portion 308 for converting content from one coding format to another coding format. Processor portion 304 may transmit and receive configuration and data rights information to digital rights management portion 310. Non-limiting examples of configuration information transmitted and received from digital rights management portion 310 includes information related to initiating, deleting, modifying and updating of data rights.

FIG. 3 illustrates a block diagram of a domain controller for securely transmitting, receiving and processing content and the associated data rights for the content.

Figure 4A:
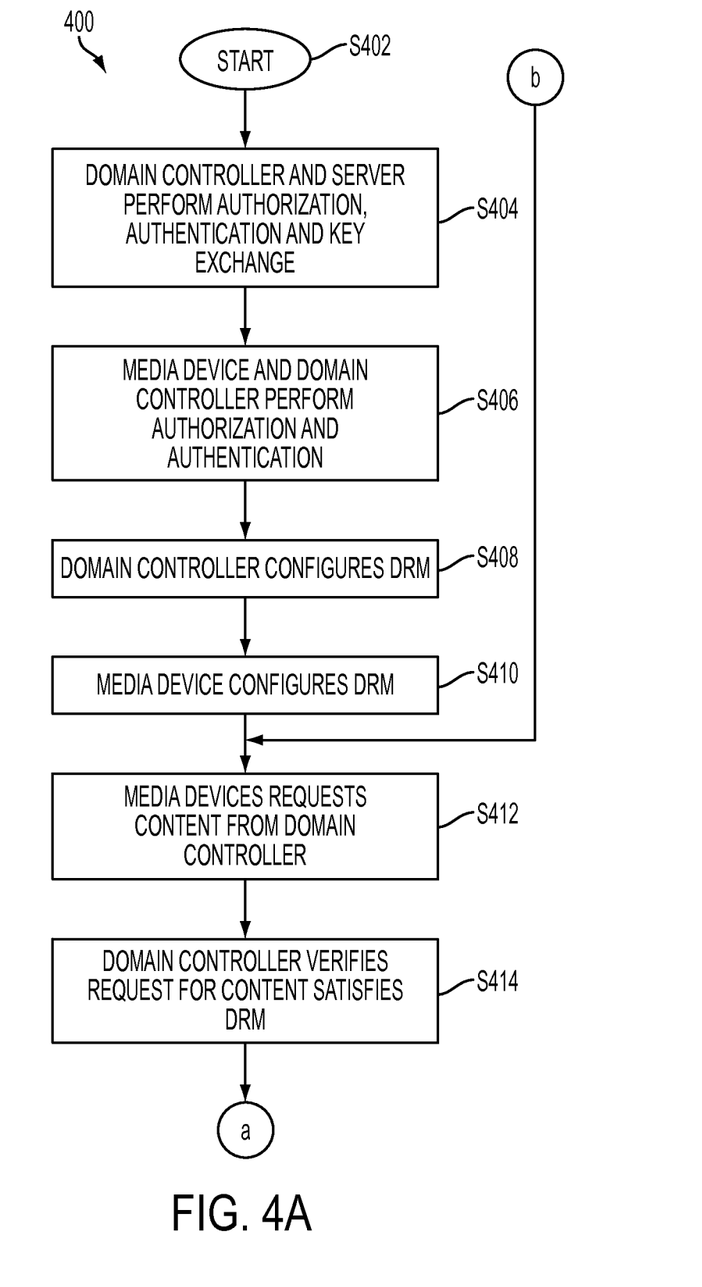
FIGS. 4A-C illustrate an example method of operating the example communication system as illustrated and discussed with reference to FIGS. 1A-F, FIG. 2 and FIG. 3 in accordance with an aspect of the present invention.
Figure 4B:
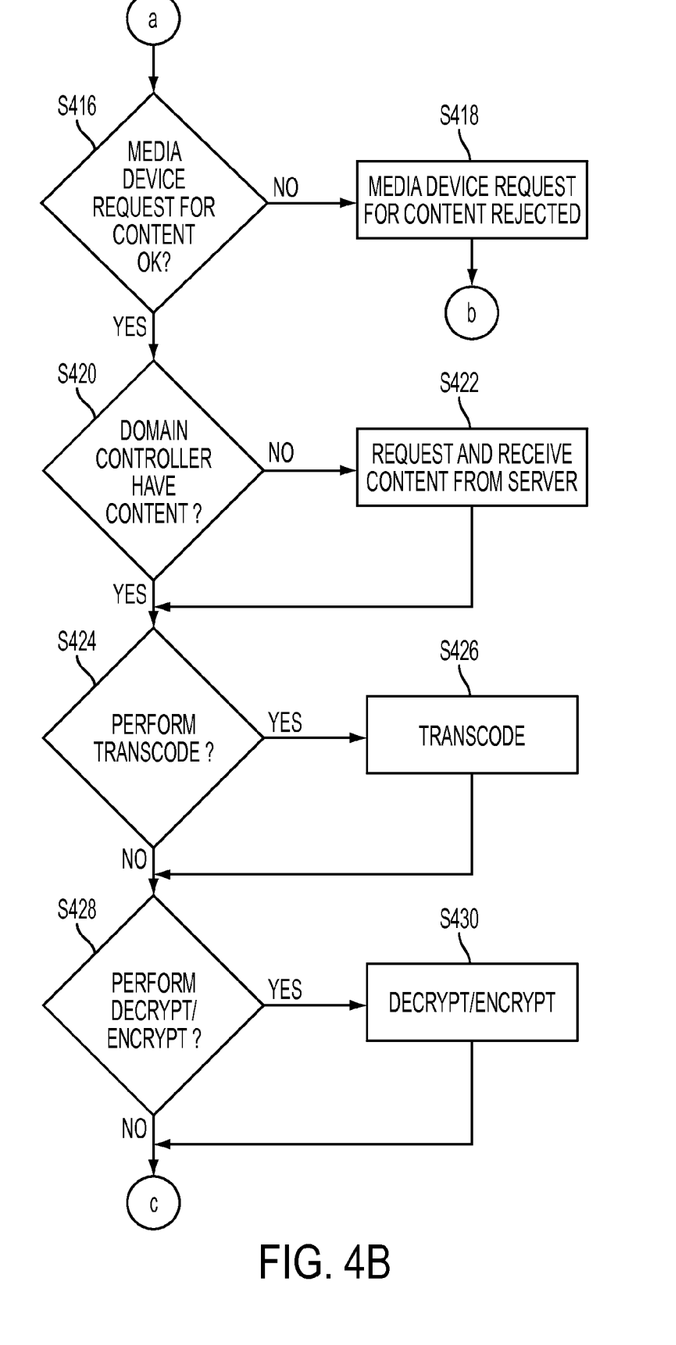
Figure 4C:
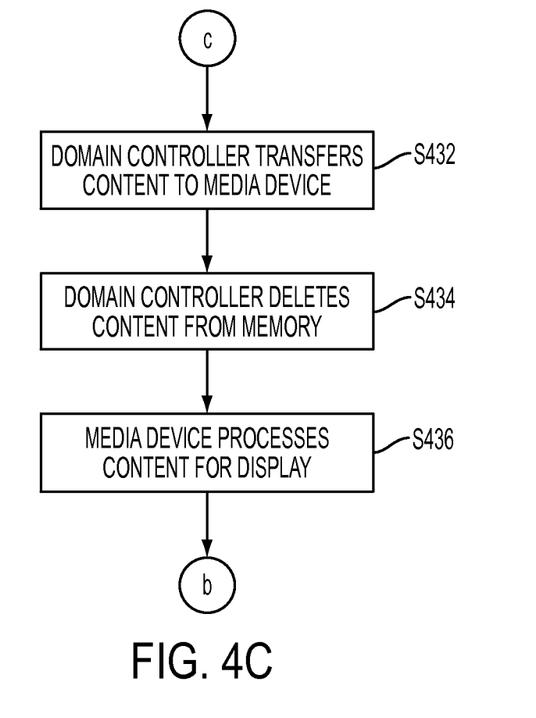

FIGS. 4A-C illustrate an example method 400 for operation of communication system 100, in accordance with an aspect of the present invention.

Starting with FIG. 4A, method 400 starts (S402) and domain controller 104 and server device 106 perform communication exchange 140, wherein authorization, authentication and key exchange may be performed between domain controller 104 and server device 106 (S404).

Domain controller 104 and server device 106 may exchange information related to communication between the devices and associated data rights.

Media device 102 and domain controller 104 may perform communication exchange 138, wherein authorization and authentication may be performed between media device 102 and domain controller 104 (S406).

Media device 102 and domain controller 104 may exchange information related to communication between the devices and associated data rights.

Domain controller 104 configures digital rights management portion 109 based upon exchange of information performed between domain controller 104 and server device 106 (S408).

Media device 102 configures DRM portion 107 based upon exchange of information performed between media device 102 and domain controller 104 (S410).

Referring now to FIGS. 1B and 2, media device 102 requests information related to content 114 as denoted by secure move message exchange 136 and key request 206 (S412).

Domain controller 104 verifies request for content 114 by media device 102 and communicates data rights associated with content 114 via key reply 208 (S414).

Referring now to FIG. 4B, media device 102 may determine status of request for content 114 (S416).

As illustrated in FIGS. 1B and 4B, for a determination of a rejection for request for content 114 (S416), user may be displayed information denoting rejection and related reason for rejection (S418) followed by user being prompted to enter or modify information related to a new or revised request (S412).

For a determination of acceptance for request for content 114 (S416), media device 102 may communicate key request 210, as illustrated in FIG. 2, to domain controller 104 with information indicating initiation of a transfer for content. Furthermore, domain controller 104 may determine whether domain controller 104 has possession of content for delivery to media device 102 (S420).

Referring now to FIG. 1C, for a determination of domain controller 104 not having possession of content 114 (S420), domain controller 104 may request and receive content 114 from server device 106 (S422).

With additional reference to FIG. 3, domain controller 104 may receive content 114 by communication portion 302 via communication channel 316. Content 114 may be transferred for storage to memory portion 312 by way of processor portion 304, communication channel 318 and communication channel 326.

Referring now to FIG. 1D, for a determination of domain controller 104 having possession of content 114 (S420), a determination may be performed for whether to perform a transcode operation of content 114.

For a determination of performing a transcode operation of content 114 (S424), a transcode operation may be performed (S426) to generate transcoded content 118.

With additional reference to FIG. 3, domain controller 104 may retrieve content 114 from memory portion 312 and transfer content 114 via communication channel 326 and communication channel 322 to transcoder portion 308 for applying transcoding operation to generate content 118.

It may be determined whether an encryption and/or decryption operation may be performed by domain controller 104 (S428) following the determination for performing a transcode operation (S424). For a determination of performing an encryption and/or decryption operation (S428), an encryption and/or decryption operation may be performed (S430) to generate encrypted/decrypted content 118.

Domain controller 104 may retrieve content 114 from memory portion 312 and transfer content 114 via communication channel 326 and communication channel 320 to security portion 306 for applying encryption and/or decryption operation to generate content 118.

Referring now to FIG. 1E, with additional reference to FIGS. 2 and 4C, domain controller 104 may communicate key reply 212 to media device 102 indicating an acknowledgement for the initiation of transfer. Domain controller 104 may transfer content 118 to media device 102 (S432). Furthermore, during transfer of content 118 to media device 102, a secondary device (not shown) may request access to content 118 and be granted authorization for transfer of content 118, but may not be granted access to content 118 until after rights data has been relinquished by media device 102 or rights data has been relinquished as a result of a transfer timeout. If rights data is relinquished as a result of a transfer timeout, then domain controller 104 updates state designation to active. Furthermore, following successful transfer and processing of content, media device 102 may communicate key request 214 to domain controller 104 indicating a transfer commit request and update rights data 126 associated with content 118.

Domain controller 104 may delete content 118 from memory of domain controller 104, update rights data 120 for removal of content 118 and communicate key reply 216 indicating a transfer commit acknowledgement (S434).

Referring now to FIG. 1F, media device 102 may process and display content 118 to user (S436).

A system and method in accordance with aspects of the present invention provides benefits over prior art content transfer systems and methods. A communication system in accordance with the present invention may securely transfer and process content and the associated rights data for the content to allow authorized access to the content and prevent unauthorized access to the content. Multiple devices may simultaneously request and initiate secure download of content even though only a single device may be granted access and the capability to utilize the content during a given timeframe. Furthermore, a transfer timeout mechanism may be implemented to allow relinquishment of rights data such that secondary entities may gain access to the content when a first device encounters a failure in the transmission of the content. In the case of a timeout, the secondary device granted access may have already transferred the content and be able to immediately utilize the content.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A domain controller comprising:
 a communication portion configured to receive a request from a media device for an encrypted content;
 a digital rights management portion configured to, in response to the request:

set rights data for the encrypted content to indicate a move of the encrypted content is pending to the media device and allocation of a right to access the content to the media device;

initiate a timer with a specified time limit for the move of the encrypted content to the media device;

monitor the move of the encrypted content to the media device;

in response to the move of the encrypted content to the media device finishing prior to the timer reaching the specified time limit, cancel the timer, and set the rights data to indicate moving of the encrypted content is disabled to other media devices; and in response to the move of the encrypted content to the media device not finishing prior to the timer reaching the specified time limit, cancel the timer and set the rights data to indicate moving of the encrypted content is enabled to other media devices and removal of the allocation of the right to access the content to the media device.

2. The domain controller of claim 1, further comprising:
an encryption portion configured to decrypt the encrypted content; and
a transcoding portion configured to transcode the decrypted content from a first format into a second format, wherein said encryption portion is further configured to encrypt the transcoded content.

3. The domain controller of claim 1, wherein the communication portion is further configured to, in response to receiving the request, obtain the encrypted content from a content source.

4. The domain controller of claim 1, further comprising:
an encryption portion configured to decrypt the encrypted content from a first encryption scheme, and re-encrypt the decrypted content with a second encryption scheme.

5. The domain controller of claim 2, wherein the digital rights management portion is further configured to allow, during the move of the encrypted content to the media device, another media device to move the encrypted content to the other media device without allocating the right to access the content to the other media device.

6. The domain controller of claim 5, wherein the digital rights management portion is further configured to, in response to the removal of the allocation of the right to access the content to the media device, allocate the right to access the content to the other media device.

7. The domain controller of claim 5, wherein the communication portion is further configured to, in response to receiving the request, obtain the right to access the encrypted content from the content source.

8. A method, comprising:
receiving, by a system including a processor, a request from a media device for an encrypted content;
in response to the request:
setting, by the system, rights data for the encrypted content to indicate a transfer of the encrypted content is pending to the media device and allocation of a right to access the content to the media device;
initiating, by the system, a timer with a specified time limit for the transfer of the encrypted content to the media device;
monitoring, by the system, the transfer of the encrypted content to the media device;
in response to the transfer of the encrypted content to the media device finishing prior to the timer reaching the specified time limit, cancelling the timer, and setting the rights data to indicate moving of the encrypted content is disabled to other media devices; and
in response to the transfer of the encrypted content to the media device not finishing prior to the timer reaching the specified time limit, cancelling the timer and setting the rights data to indicate moving of the encrypted content is enabled to other media devices and removal of the allocation of the right to access the content to the media device.

9. The method of claim 8, further comprising:
decrypting, by the system, the encrypted content;
transcoding, by the system, the decrypted content from a first format into a second format; and
encrypting, by the system, the transcoded content.

10. The method of claim 8, further comprising, in response to receiving the request, procuring, by the system, the encrypted content from a content source.

11. The method of claim 8, further comprising:
decrypting, by the system, the encrypted content from a first encryption scheme; and
re-encrypting, by the system, the decrypted content with a second encryption scheme.

12. The method of claim 9, further comprising, allowing, by the system during the move of the encrypted content to the media device, another media device to transfer the encrypted content to the other media device without allocating the right to access the content to the other media device.

13. The method of claim 10, further comprising, in response to receiving the request, procuring, by the system, the right to access encrypted content from the content source.

14. The method of claim 12, further comprising, in response to the removal of the allocation of the right to access the content to the media device, allocating, by the system, the right to access the content to the other media device.

15. A non-transitory computer-readable medium having instructions stored thereon that, in response to execution, cause a system including a processor to perform operations comprising:
receiving a request for encrypted content from a first media device;
in response to the request:
setting rights data for the encrypted content to indicate a copying of the encrypted content is pending to the media device and allocation of a right to access the content to the media device
initiating a timer with a specified time limit for the copying of the encrypted content to the media device;
monitoring the copying of the encrypted content to the first media device;
in response to the copying of the encrypted content to the media device finishing prior to the timer reaching the specified time limit, cancelling the timer and updating the rights data to indicate copying of the encrypted content is disabled to other media devices;
in response to the copying of the encrypted content to the media device not finishing prior to the timer reaching the specified time limit cancelling the timer and updating the rights data to indicate copying of the encrypted content is enabled to other media devices and removal of the allocation of the right to access the content to the media device.

16. The non-transitory computer-readable medium of claim 15, the operations further comprising, permitting, during the copying of the encrypted content to the media device, another media device to copy the encrypted content to the other media device without allocating the right to access the content to the other media device updating the rights data to a move pending state.

17. The method non-transitory computer-readable medium of claim 15, the operations further comprising:
   decrypting the encrypted content from a first encryption scheme; and
   re-encrypting the decrypted content with a second encryption scheme.

18. The non-transitory computer-readable medium of claim 16, the operations further comprising, in response to the removal of the allocation of the right to access the content to the media device, allocating the right to access the content to the other media device.

19. The non-transitory computer-readable medium of claim 16, the operations further comprising, in response to receiving the request, procuring the encrypted content from a content source.

20. The method non-transitory computer-readable medium of claim 19, the operations further comprising, in response to receiving the request, procuring the right to access encrypted content from the content source.

\* \* \* \* \*